United States Patent
Robertson et al.

(10) Patent No.: US 10,012,238 B2
(45) Date of Patent: Jul. 3, 2018

(54) ELECTROSTATIC DISCHARGE PREVENTION FOR A FAN BLADE

(71) Applicant: UNITED TECHNOLOGIES CORPORATION, Farmington, CT (US)

(72) Inventors: Thomas J. Robertson, Glastonbury, CT (US); James O. Hansen, Glastonbury, CT (US); Mark Quinn, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 129 days.

(21) Appl. No.: 14/695,178

(22) Filed: Apr. 24, 2015

(65) Prior Publication Data
US 2016/0312793 A1 Oct. 27, 2016

(51) Int. Cl.
 F04D 29/00 (2006.01)
 F04D 29/38 (2006.01)
 F01D 5/14 (2006.01)
 F01D 5/28 (2006.01)
 F01D 5/30 (2006.01)

(52) U.S. Cl.
 CPC ........... F04D 29/388 (2013.01); F01D 5/147 (2013.01); F01D 5/288 (2013.01); F01D 5/3015 (2013.01); F01D 5/3092 (2013.01); F05D 2220/36 (2013.01); F05D 2300/50 (2013.01); Y02T 50/672 (2013.01)

(58) Field of Classification Search
 CPC ........ F04D 29/388; F01D 5/147; F01D 5/288; F01D 5/3015; F01D 5/3092; F05D 2200/36; F05D 2300/50; Y02T 50/672
 USPC ................................................. 60/805
 See application file for complete search history.

(56) References Cited

U.S. PATENT DOCUMENTS 2,776,253 A * 1/1957 Scholl ............... B29D 99/0025
 156/150
2,959,229 A * 11/1960 Meier .................. B64C 11/205
 416/229 R (Continued)

FOREIGN PATENT DOCUMENTS

EP 2604794 A1 * 6/2013
EP 3018289 A1 * 5/2016

OTHER PUBLICATIONS

European Search Report for EP Application No. 16 16 6921.

*Primary Examiner* — Peter Helvey
(74) *Attorney, Agent, or Firm* — Cantor Colburn LLP

(57) ABSTRACT

A fan blade capable of dissipating a buildup of electrostatic charge configured for operation within the fan assembly of a gas turbine engine. The fan blade has a fan blade body covered in a static dissipative coating. A conductive ground tab is attached to the front face of an airfoil root of the fan blade. Connected to the ground tab, a conductive flow path travels up the neck portion of the airfoil and along a lower portion of the fan blade. As static charge builds up on the fan blade, the electrostatic charge migrates down the fan blade and into the conductive flow path. Traveling along the conductive flow path the buildup of electrostatic charge accumulates on the conductive ground tab and exits the fan blade through contact with a disc rotor covering touching the conductive ground tab.

20 Claims, 5 Drawing Sheets

(56) References Cited

U.S. PATENT DOCUMENTS

| | | | | |
|---|---|---|---|---|
| 4,274,697 A | * | 6/1981 | Dodge | H01R 13/652 |
| | | | | 439/101 |
| 4,802,824 A | * | 2/1989 | Gastebois | F01D 5/282 |
| | | | | 416/193 A |
| 5,123,813 A | * | 6/1992 | Przytulski | F01D 5/26 |
| | | | | 403/372 |
| 6,004,101 A | * | 12/1999 | Schilling | F01D 5/28 |
| | | | | 416/219 R |
| 7,462,074 B1 | * | 12/2008 | Devlin | H01R 13/652 |
| | | | | 439/106 |
| 7,780,419 B1 | * | 8/2010 | Matheny | F01D 5/005 |
| | | | | 416/221 |
| 2002/0071760 A1 | * | 6/2002 | Dingwell | F01D 17/162 |
| | | | | 415/160 |
| 2011/0142644 A1 | * | 6/2011 | Fritz | F03D 1/0675 |
| | | | | 416/146 R |
| 2012/0003100 A1 | * | 1/2012 | James | F01D 5/282 |
| | | | | 416/230 |
| 2014/0109546 A1 | * | 4/2014 | Drozdenko | F01D 21/14 |
| | | | | 60/39.091 |
| 2016/0090849 A1 | * | 3/2016 | Robertson | F01D 5/288 |
| | | | | 60/805 |
| 2016/0312793 A1 | * | 10/2016 | Robertson | F04D 29/388 |

\* cited by examiner

ELECTROSTATIC DISCHARGE PREVENTION FOR A FAN BLADE

FIELD OF DISCLOSURE

The present disclosure generally relates to gas turbine engines, and more particularly to preventing electrostatic discharge from the fan blades of the gas turbine engines.

BACKGROUND OF THE DISCLOSURE

Gas turbine engines are commonly used to generate energy and propulsion in many modern aircraft as well as other vehicles and industrial processes. Many such engines include a fan, compressor, combustor and turbine provided in serial fashion, forming an engine core and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via a central rotating shaft. Energy from the combustion gases not used by the turbine is discharged through an exhaust nozzle, producing thrust to power the aircraft.

In light of this it can be seen that the airfoils of a gas turbine engine, in addition to the fan, compressor, and turbine blades and vanes, are subjected to extreme internal temperatures and weather conditions when the gas turbine engine is in operation. Accordingly, such airfoils need to be manufactured well. Many issues can occur with the airfoils which can lead to dangerous or less than optimal operation of the gas turbine engine. One of these situations occurs when electrostatic charge builds up on the airfoils of the gas turbine engine.

When the gas turbine engine is in operation, the airfoils of the fan rotate around a central longitudinal axis providing thrust for the engine. However, the air that passes through these airfoils providing the thrust needed from propulsion is not free from impurities. In operating conditions the air that passes through the gas turbine engine may have snow, dust, sand, or volcanic ash particles along with it as it passes through the gas turbine engine. Even though these particles are non-conductive materials, when these particles pass by the airfoils of the gas turbine engine they can rub against the airfoils causing electrostatic charging on the airfoils. The friction of the impurity particles against the airfoils causes this buildup of electrostatic charge.

Electrostatic charge build up on the airfoils of a gas turbine engine can lead to dangerous outcomes. If the electrostatic charge is not properly dissipated, the electrostatic charge can spark and cause injury to ground workers approaching the gas turbine engine after operation. The electrostatic charge build up on the airfoils can also spark from the airfoils to the sides of the gas turbine engine enclosure or other airfoils leading to possible material or surface damage to these components. In catastrophic operational scenarios, it is possible that this electrostatic charge build up could spark and improperly ignite fuel vapors outside the gas turbine engine environment. Additionally, electrostatic charge buildup and sparking can lead to radio interference for the pilot hindering communication with other aircraft or flight control.

Even if the electrostatic charge build up on the airfoils does not discharge as a spark, the buildup of static charge can still limit optimal operation of the gas turbine engine. If the electrostatic charge buildup does not spark, electronic charge will accumulate on the airfoils eventually ionize the air surrounding the airfoils. This effect is called a corona. The presence of a corona around the airfoils can lead to increased radio interference and make radio communication difficult for the pilot.

Therefore, it would be advantageous to produce an airfoil of sufficient strength and design to avoid the buildup of electrostatic charge. Furthermore, is would be advantageous for the airfoil to properly dissipate the buildup of electrostatic charge so that proper operation of the gas turbine engine can be achieved without the unnecessary and potential dangerous consequences the buildup of electrostatic charge on the airfoil presents.

SUMMARY OF THE DISCLOSURE

In accordance with one aspect of the disclosure, a fan blade is formed having a fan blade body with a blade component and an airfoil root. The fan blade body is covered in an electrostatic dissipative coating. A conductive ground tab is attached to the air foil root of the fan blade body. Attached to the conductive ground tab is a conductive flow path which runs along the airfoil root and a lower portion of the blade component of the fan blade body.

In an additional and/or alternative embodiment of any of the foregoing embodiments, the electrostatic dissipative coating is a urethane based coating.

In an additional and/or alternative embodiment of any of the foregoing embodiments, the conductive flow path is a conductive tape.

In an additional and/or alternative embodiment of any of the foregoing embodiments, the conductive flow path is a conductive sheet metal or a conductive foil.

In an additional and/or alternative embodiment of any of the foregoing embodiments, the conductive flow path is a conductive coating.

In an additional and/or alternative embodiment of any of the foregoing embodiment, the conductive flow path is a plurality of conductive ground wires.

In an additional and/or alternative embodiment of the foregoing embodiment, the plurality of conductive ground wires is secured to a top portion of the conductive ground tab by a weld. The plurality of conductive ground wires then run from the conductive ground tab up a neck portion of the airfoil root and along an underside of a fin platform of the fan blade body.

In an additional and/or alternative embodiment of any of the foregoing embodiments, the plurality of conductive ground wires are completely covered with an epoxy securing the plurality of conductive ground wires to the neck portion of the airfoil root and along the underside of the fin platform of the fan blade body.

In an additional and/or alternative embodiment of any of the foregoing embodiments, the conductive ground tab is attached in the middle of a front face of the airfoil root and secured to the front face of the airfoil root by an epoxy.

In an additional and/or alternative embodiment of any of the foregoing embodiments, the conductive ground tab is in contact with a disc rotor covering, the conductive ground tab being an end flow point of an accumulated electrostatic charge on the fan blade body. The accumulated electrostatic charge is transferred to the disc rotor covering through contact with the conductive ground tab.

In accordance with another aspect of the disclosure, a gas turbine engine is formed having a fan, a compressor downstream of the fan, a combustor downstream of the compressor, and a turbine downstream of the combustor. The fan has a plurality of fan blades connected to a rotor. The plurality of fan blades each have a fan blade body with a blade component and an airfoil root. The fan blade body is covered in an electrostatic dissipative coating. A conductive ground tab is attached to the air foil root of the fan blade body. Attached to the conductive ground tab is a conductive flow path which runs along the airfoil root and a lower portion of the blade component of the fan blade body.

In an additional and/or alternative embodiment of any of the foregoing embodiments, the conductive flow path of each of the plurality of fan blades is a conductive tape.

In an additional and/or alternative embodiment of any of the foregoing embodiments, the conductive flow path of each of the plurality of fan blades is a conductive sheet metal or a conductive foil.

In an additional and/or alternative embodiment of any of the foregoing embodiments, the conductive flow path of each of the plurality of fan blades is a conductive coating.

In an additional and/or alternative embodiment of any of the foregoing embodiments, the conductive flow path of each of the plurality of fan blades is a plurality of conductive ground wires.

In an additional and/or alternative embodiment of the foregoing embodiment, the plurality of conductive ground wires of each of the plurality of fan blades are secured to a top portion of the conductive ground tab by a weld. The plurality of conductive ground wires then run from the conductive ground tab up a neck portion of the airfoil root and along an underside of a fin platform of the fan blade body.

In an additional and/or alternative embodiment of the foregoing embodiment, the plurality of conductive ground wires of each of the plurality of fan blades are completely covered with an epoxy securing the plurality of conductive ground wires to the neck portion of the airfoil root and along the underside of the fin platform of the fan blade body.

In an additional and/or alternative embodiment of any of the foregoing embodiments, the conductive ground tab of each of the plurality of fan blades is attached in the middle of a front face of the airfoil root and secured to the front face of the airfoil root by an epoxy.

In an additional and/or alternative embodiment of any of the foregoing embodiments, the conductive ground tab of each of the plurality of fan blades is in contact with a disc rotor covering, the conductive ground tab being an end flow point of an accumulated electrostatic charge on the fan blade body. The accumulated electrostatic charge is transferred to the disc rotor covering through contact with the conductive ground tab.

In accordance with another aspect of the disclosure, a method of making an airfoil for a gas turbine engine is depicted. A fan blade body is machined having a blade component, a fin platform and an airfoil root. An electrostatic dissipative coating then covers the fan blade body. A conductive ground tab is then attached to a front face of the airfoil root with an epoxy. Then, a conductive flow path is attached to the conductive ground tab. The conductive flow path travels up a neck portion of the airfoil root and along an underside of the fin platform of the fan blade body. Finally, the conductive flow path is covered with an epoxy securely attaching the conductive flow path to each the neck portion of the airfoil root and the underside of the fin platform of the fan blade body.

These and other aspects and features will be better understood when taken in conjunction with the following drawings.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION OF THE DISCLOSURE

Figure 1:
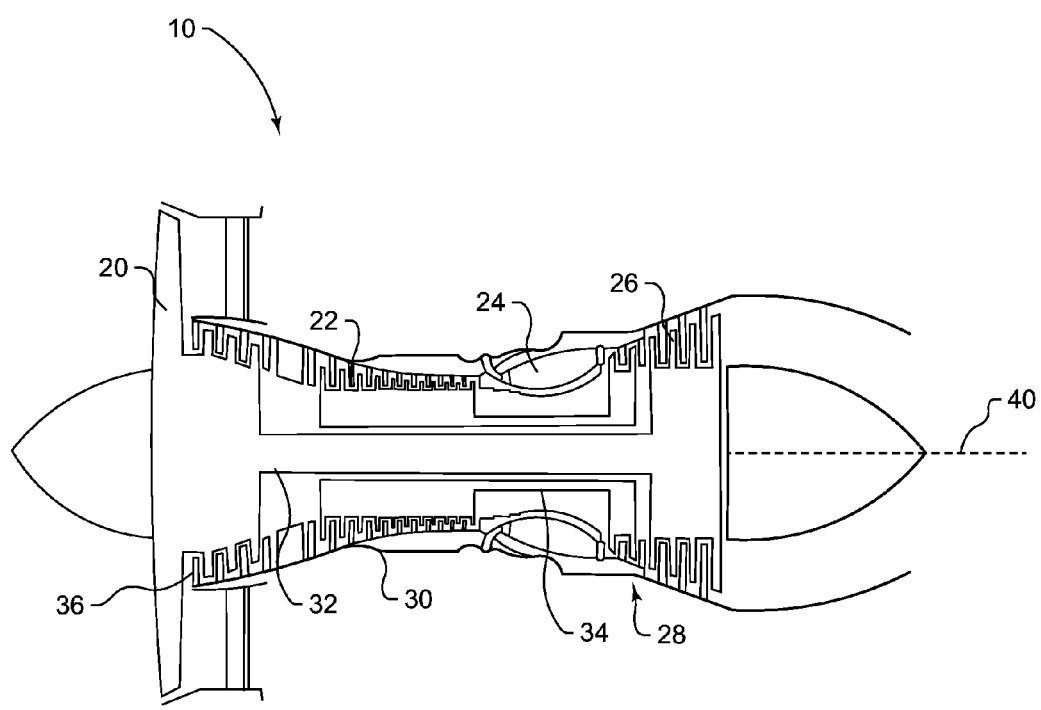
FIG. 1 is a cross-sectional view of a gas turbine engine constructed in accordance with the teachings of the present disclosure.

Referring now to the drawings and with specific reference to FIG. 1, a gas turbine engine constructed in accordance with the present disclosure is generally referred to by reference numeral 10. As illustrated, the engine 10, includes from fore-to-aft, a fan 20, a compressor 22, a combustor 24, a turbine 26, known as the engine core 28, lying along a central longitudinal axis 40, and surrounded by an engine core cowl 30. The compressor 22 is connected to the turbine 26 via a central rotating shaft 32. More specifically, the engine 10 is depicted as a multi-spool engine design. Plural turbines sections 26 are connected to, and drive, corresponding plural sections of the compressor 22 and a fan 20 via the central rotating shaft 32 and a concentric rotating shaft 34, enabling increased compression efficiency.

Ambient air enters the compressor 22 at an inlet 36, is pressurized, and is then directed to the combustor 24, mixed with fuel and combusted. This generates combustion gases that flow downstream to the turbine 26, which extracts kinetic energy from the exhausted combustion gases. The turbine 26, via the central rotating shaft 32 and concentric rotation shaft 34, drives the compressor 22 and the fan 20, which draws in ambient air. Thrust is produced both by ambient air accelerated aft by the fan 20 and by exhaust gasses exiting from the engine core 28. While the depicted embodiment is described as a multi-spool type of gas turbine engine, it is to be understood that the teachings of the present disclosure are not limited in application to the depicted embodiment of a gas turbine engine, but rather should be employed with equal efficacy.

Figure 2:
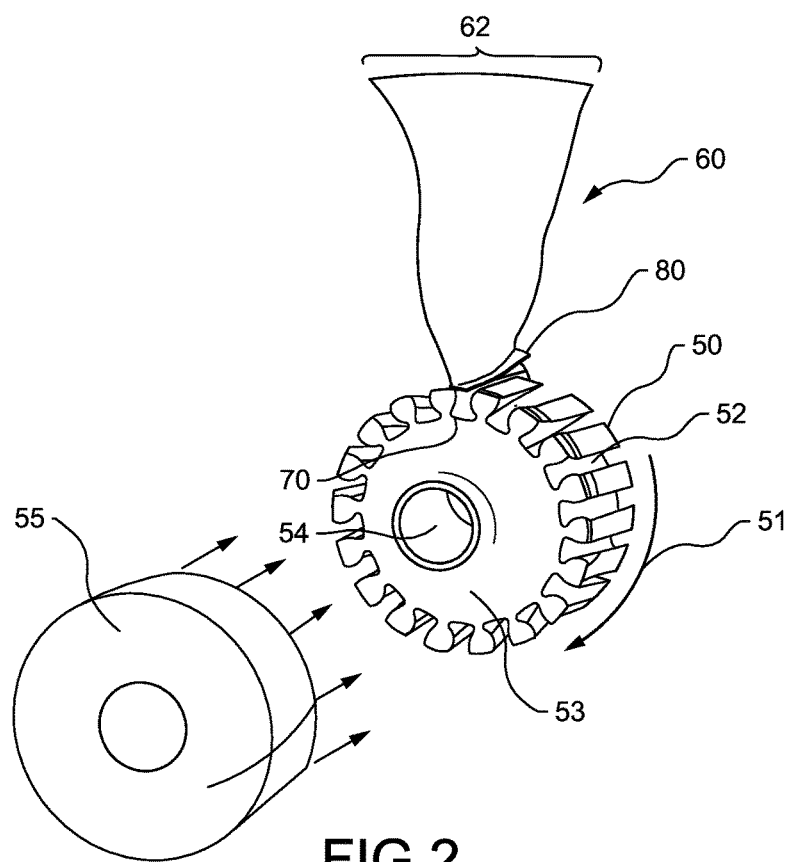
FIG. 2 is a perspective view of a fan blade inserted into a disc rotor of a gas turbine engine in accordance with the present disclosure.

Referring now to FIG. 2, the fan 20 is shown in greater detail. More specifically, the fan 20 includes a disc rotor 50 having multiple slots 52 disposed around the circumference 51 of the disc rotor 50. The slots 52 may be equally spaced around the circumference 51 of the disc rotor 50. In the center of the disc rotor 50, a bearing aperture 54, running along the central longitudinal axis 40, is present where a central rotating shaft 32 or another connection can fit the fan 20 to the power generation unit of the gas turbine engine 10.

Radially extending from the rotor 50, a plurality of fan blades 60 are provided. As will be noted, in an embodiment of the present disclosure each of the plurality of fan blades includes a blade component 62, a fin platform 80 and an airfoil root 70. While the fin platform 80 is disclosed in this embodiment of the present disclosure, it is to be understood that many other fan blade configurations which do not have a fin platform 80 may be used. The airfoil root 70 may be a dovetail in shape, with the slots 52 being complementarily formed to receive the dovetail root 70 in a secure fashion. Given this size and shape, the dovetail root 70 presses against the sides of the slots 52 due to centrifugal force when the disc rotor 50 spins around the central longitudinal axis 40. The slots 52 pressing against the dovetail root 70 therefore prevent the fan blade 60 from dislodging from the disc rotor 50 when the gas turbine engine 10 is in operation. Additionally, a disc rotor covering 55 is attached to the front face 53 of the disc rotor 50. The disc rotor covering 55 in an embodiment of the present disclosure is a locking mechanism which locks the fan blade 60 into its corresponding slot 52 within the disc rotor 50. Furthermore, the disc rotor covering 55 also helps prevent the fan blade 60 from dislodging from the disc rotor 50 when the gas turbine engine 10 is in operation.

Figure 3:
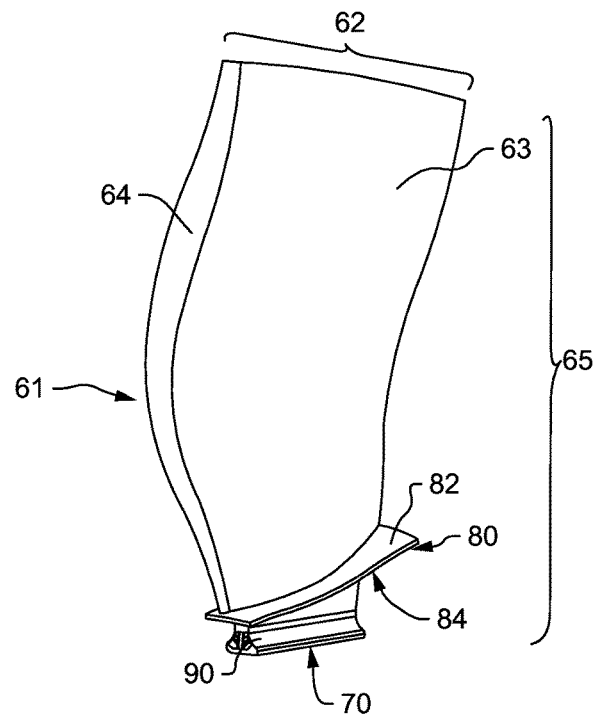
FIG. 3 is a perspective view of a fan blade constructed in accordance with the present disclosure.

Viewing FIG. 3, the fan blade 60 can be seen in more detail. The blade component 62 of the fan blade 60 has a fan blade body 65 encompassing the major of the fan blade 60. The fan blade body 65 in an embodiment of the present disclosure in made from aluminum material, but may be made from other materials, titanium, composites, or the like. An electrostatic dissipative coating 63 is applied to the fan blade body 65 covering the fan blade body 65. In an embodiment of the present disclosure, the electrostatic dissipative coating 63 is an electrostatic dissipative urethane, however other electrostatic dissipative coating materials may be used to facilitate like results. On the leading edge 61 of the blade component 62 of the fan blade 60 a sheath 64 is present. The sheath 64 may be bonded to the fan blade body 65 by an epoxy or by other means. In an embodiment of the present disclosure, the sheath 64 is made from titanium material, but other materials, composites or the like may be used. Located towards the bottom portion of the fan blade body 65, a fin platform 80 of the fan blade body 65 protrudes outward. The fin platform 80 protrudes outward on each side of the fan blade 60 and is part of the fan blade body 65. Additionally, fin platform 80 protrudes outwards towards the leading edge 61 of the fan blade body 65. The fin platform 80 is also covered in the static dissipative coating 63 on a top side 82 of the fin platform 80. The underside 84 of the fin platform 80 is not covered in the electrostatic dissipative coating 63. Below the fin platform 80 of the fan blade 60, a dovetail root 70 finishes the fan blade body 65. The dovetail root 70 in an embodiment of the present disclosure has a wear covering 90 enveloping the sides of the dovetail root 70.

Figure 4:
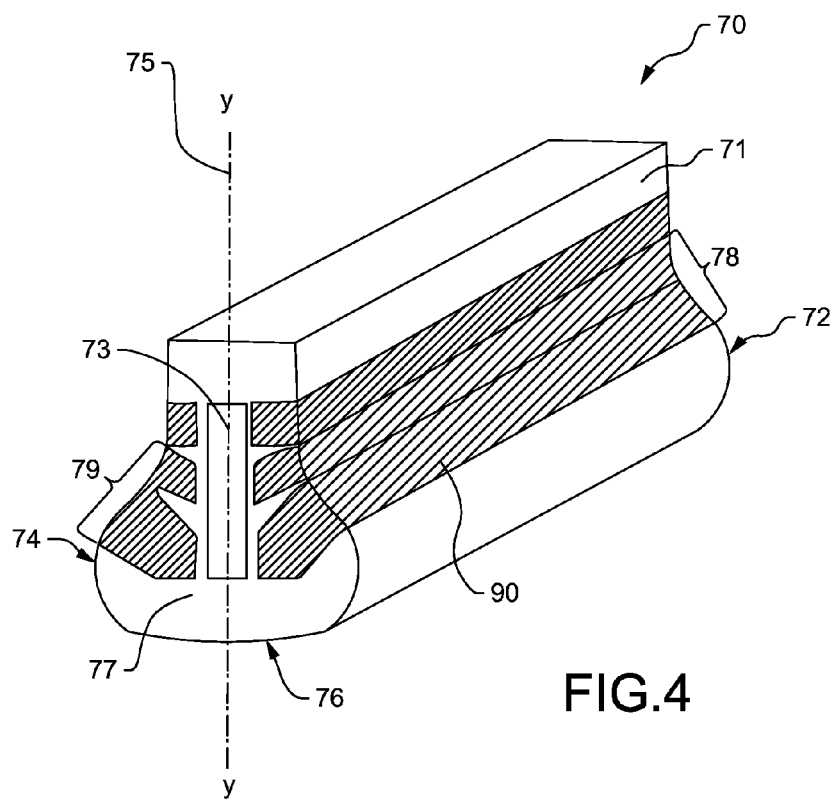
FIG. 4 is an enlarged perspective view of a dovetail root section of a fan blade constructed in accordance with the present disclosure.

The dovetail root 70 can be seen in more detail in FIG. 4. The dovetail root 70 is formed as part of the fan blade body 65, which in an embodiment of the present disclosure is an aluminum material. The dovetail root 70 has a first pressure face 72 and a second pressure face 74 angling outward from the vertical axis 75 of the dovetail root 70. At the bottom of the dovetail root 70, a horizontal face 76 connects the first pressure face 72 to the second pressure face 74. A neck portion 71 extends upward from both the first pressure face 72 and the second pressure face 74 of the dovetail root 70, and attaches to the fin platform 80 of the fan blade 60.

A first runout fillet 78 is machined onto the first pressure face 72 of the dovetail root 70 so that it may fit into a slot 52 of the disc rotor 50. Likewise, a second runout fillet 79 is machined onto the second pressure face 74 of the dovetail root 70 so that it may fit the same. The first runout fillet 78 and the second runout fillet 79 each travel the length of their respective pressure faces, and may be equal to each other in their size, shape and formation on the dovetail root 70.

A conductive ground tab 73 is placed in the middle of a front face 77 of the dovetail root 70 and affixed to fan blade body 65. The conductive ground tab 73 is epoxy bonded to the fan blade body 65 of the dovetail root 70. Additionally, positioned to each side of the conductive ground tab 73, a wear covering 90 is attached to the fan blade body 65 of the dovetail root 70 by an epoxy. The wear covering 90 also envelops the length of the first runout fillet 78 of the first pressure face 72 as well as the second runout fillet 79 of the second pressure face 74 of the dovetail root 70. Additionally, the wear covering 90 can extend to envelop part the neck portion 71 of the dovetail root 70 above both the first runout fillet 78 and the second runout fillet 79. The wear covering 90 envelops the dovetail root 70 in a precise geometric pattern over the dovetail root 70 so that the areas of the dovetail root 70 which press against the walls of the slot 52 are adequately protected when the disc rotor 50 rotates. Configuring the wear covering 90 in such a way prevents cracking and deformation of the dovetail root 70 when the gas turbine engine 10 is in operation. Additionally, the wear covering 90 protects the dovetail root 70 from handling damage when placing the dovetail root 70 into the slot 52 of the disc rotor 50.

Figure 5:
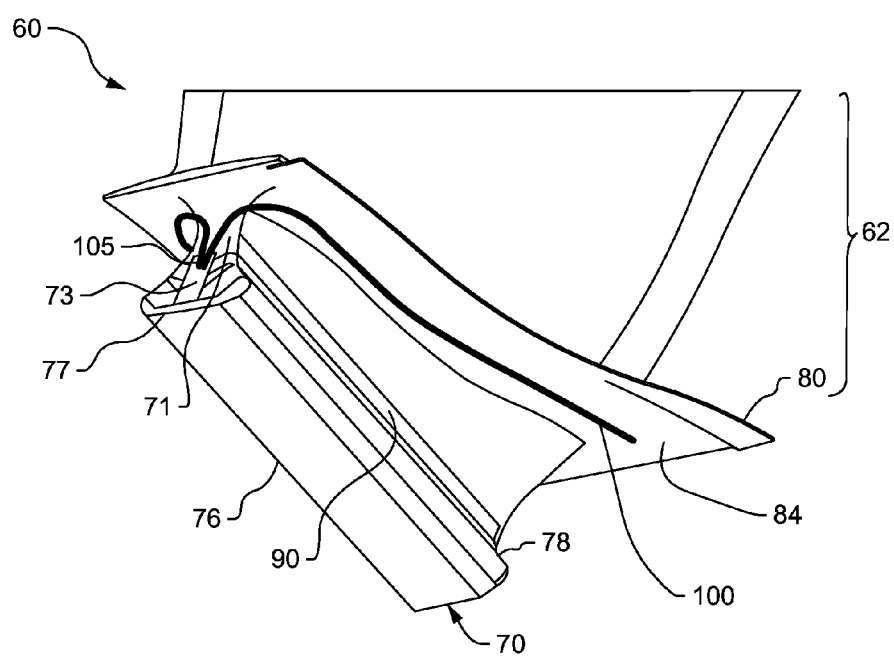
FIG. 5 is an underneath perspective view of a fan blade in accordance with the present disclosure showing placement of a conductive ground tab and a conductive flow path on the fan blade.

FIG. 5, as illustrated, shows an angled view of the dovetail root 70, blade component 62 and fin platform 80 of the fan blade 60. Viewed from underneath, the horizontal face 76 of the dovetail root 70 and the underside 84 of the fin platform 80 of the fan blade 80 are visible. On the dovetail root 70 the conductive ground tab 73 is viewed in the middle of the front face 77 of the dovetail root 70. The wear covering 90 envelops part of the front face 77 of the dovetail root 70 outside of the conductive ground tab 73 and continues down each side of the dovetail root 70 enveloping the first and second runout fillets 78 and 79 of the dovetail root 70. At a top portion of the conductive ground tab 73 on the dovetail root 70, a conductive flow path 100 attaches to the conductive ground tab 73 and travels along the dovetail root 70 and onto a lower portion of the blade component 62 of the fan blade body 65. In an embodiment of the present disclosure which has a fin platform 80 of the fan blade body 65, the conductive flow path 100 travels along the underside 84 of the fin platform 80. In an embodiment of the present disclosure, the conductive flow path 100 consists of two conductive ground wires 100. It should be understood, however, that the conductive flow path 100 may be other conductive materials, such as conductive tape, conductive sheet metal/foil, or a conductive coating, which are capable of transmitting a charge to the conductive ground tab 73. The two conductive ground wires 100 in an embodiment of the present disclosure are welded 105 to the top portion of the conductive ground tab 73. The weld 105 connecting the two conductive ground wires 100 to the top portion of the conductive ground tab 73 is created from a 0.020" to 0.031" diameter weld wire. The two conductive ground wires 100 each exit the top portion of the ground tab 73 and individually continue up the neck portion 71 of the dovetail root 70. One conductive ground wire 100 turns to the right and follows underside 84 of the fin platform 80 of the fan blade body 65 protruding on that side of the fan blade 60. The other conductive ground wire 100 turns to the left and follows the underside 84 of the fin platform 80 protruding on the opposite side. In an embodiment of the present disclosure, the conductive ground wires 100 are made from titanium material although other conductive materials may be used. Each of the conductive ground wires 100 is attached to the underside 84 of fin platform 80 of the fan blade body 65. Epoxy affixed the conductive ground wires 100 to the neck portion 71 of the dovetail root 70 and to the underside 84 of the fin platform 80 of the fan blade body 65. Epoxy must completely cover the conductive ground wires 100 as they run along the neck portion 71 of the dovetail root 70 and the underside 84 of the fin platform 80 of the fan blade body 65 to prevent galvanic action in the fan blade 60 in the event electrostatic sparking damage causes a loss or burn to the electrostatic dissipative coating 63 on the fan blade body 65.

Figure 6:
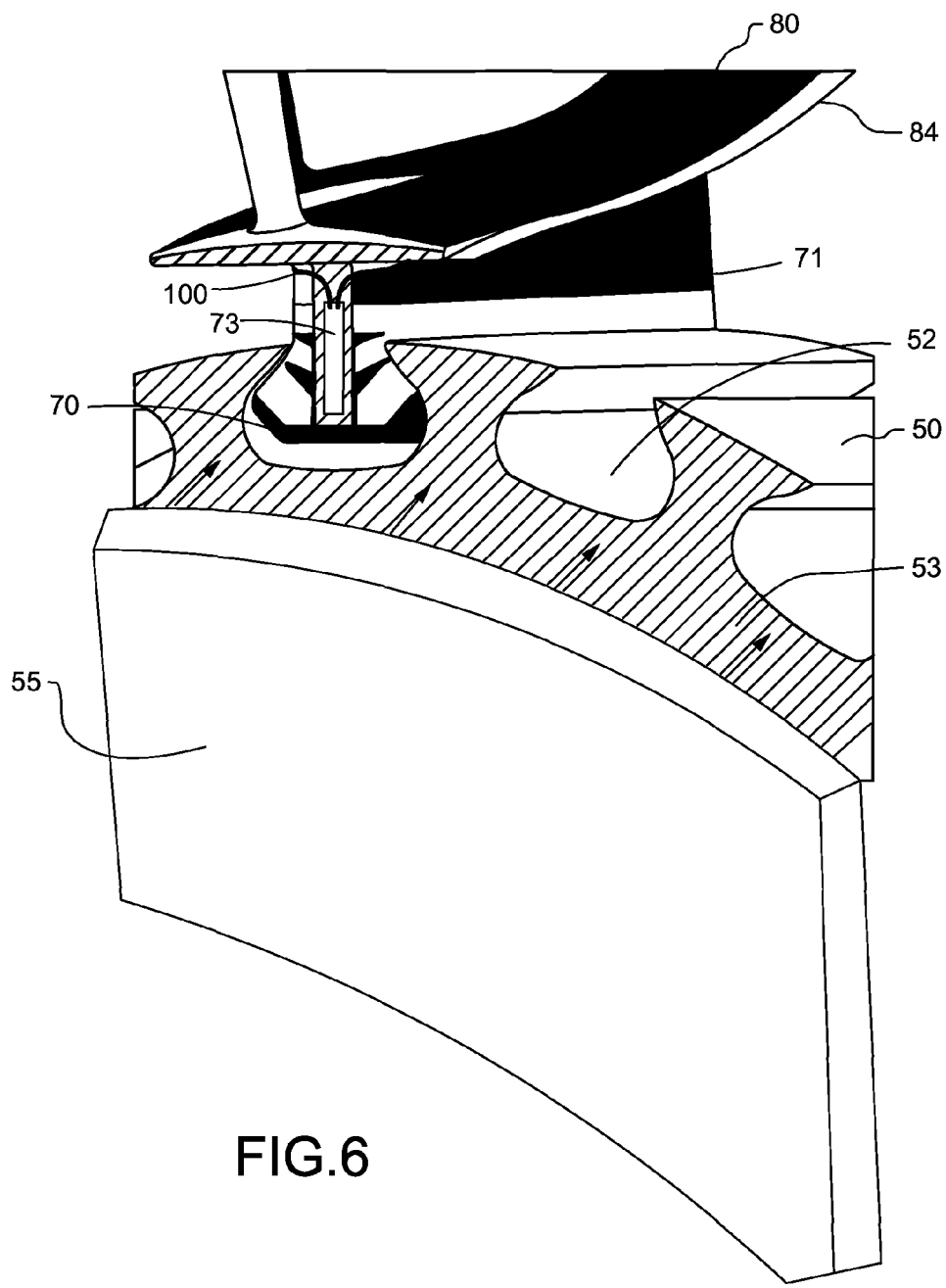
FIG. 6 is a cross-sectional view of a dovetail root of a fan blade in accordance with the present disclosure, showing placement of a conductive ground tab and conductive flow path on the dovetail root when the dovetail root is placed in a disc rotor of a gas turbine fan engine.

As illustrated in FIG. 6, the dovetail root 70 of the fan blade 60 is placed within one of the slots 52 of the disc rotor 50. As understood from above, the dovetail root 70 has a conductive ground tab 73 attached to the front face 77 of the dovetail root 70 with two conductive ground wires 100 attached to the conductive ground tab 73. The two conductive ground wires 100 travel up the neck 71 of the dovetail root 70 and along the underside 84 of the fin platform 80 of the fan blade body 65. After the dovetail root 70 is placed in the slot 52, a disc rotor covering 55 can be placed over the front face 53 of the disc rotor 50. The disc rotor coving 55 will lock the dovetail root 70 and the entire fan blade 60 in place within the correct slot 52 of the disc rotor 50. When the dovetail root 70 is locked in this position, the conductive ground tab 73 is in contact with the disc rotor covering 55. This contact provides safe passage of the electrostatic charge accumulating on the conductive ground tab 73 to the larger body of the rotor covering 55. After entering the disc rotor covering 55, the electrostatic charge dissipates through the conductive components of the gas turbine engine 10.

When the fan blade 60 is locked into the disc rotor 50 as viewed in FIG. 6, the gas turbine engine 10 can safely operate. As the gas turbine engine 10 operates, the fan blade 60 in the slot 52 of the disc rotor 50 rotates along the central longitudinal axis 40. As air passes by the rotation fan blade 60, particles within the air in the form of dust, snow, sand, or volcanic ash or the like come in contact with the fan blade 60 as they pass through the gas turbine engine 10. Although the electrostatic dissipative coating 63 helps eliminate electrostatic charge from developing on the fan blade 60, some electrostatic charge will still accumulate from the friction between the fan blade 60 and the particles. As the electrostatic charge accumulates on the fan blade 60, the electrostatic charge is drawn downwards on the fan blade 60 toward the dovetail root 70. The electrostatic charge follows the fan blade body 65, including the fin platform 80, and moves towards the two conductive ground wires 100 connected to the underside 84 of the fin platform 80. The two conductive ground wires 100 attract the electrostatic charge because the two conductive ground wires 100 have the lowest potential of all the components of the fan blade 60. From there, the electrostatic charge follows the two conductive ground wires 100 underneath the fin platform 80 and travels the length of the two conductive ground wires 100 towards the conductive ground tab 73. The current of electrostatic charge then reaches the conductive ground tab 73 and exits the fan blade 60 through the disc rotor covering 55 since the disc rotor covering 55 is in contact with the conductive ground tab 73. Allowing the buildup of electrostatic charge to follow this path prevents the charge from sparking between the disc rotor 50 and the dovetail root 70 of the fan blade 60. Additionally, allowing the buildup of electrostatic charge to follow this path prevents the charge from sparking between the sheath 71 and disc rotor 50. Preventing this type of electrostatic charge sparking eliminates the risk of damaging the wear covering 90 on the dovetail root 70 of the fan blade 60 and eliminates the risk of damaging the static dissipative covering 63 on the fan blade body 65. Eliminating the buildup of electrostatic charge in such a fashion also prevents the charge from sparking between the fan blade 60 and the outer casing of the gas turbine engine 10. This in turn leads to a lower risk of the igniting fuel vapors outside of the proper engine components and to less radio interference for the operators of the gas turbine engine 10. Additionally, removing the buildup of electrostatic charge in such a manner reduces the potential injury risk to workers approaching the gas turbine engine 10 shortly after it has ceased operation.

Figure 7:
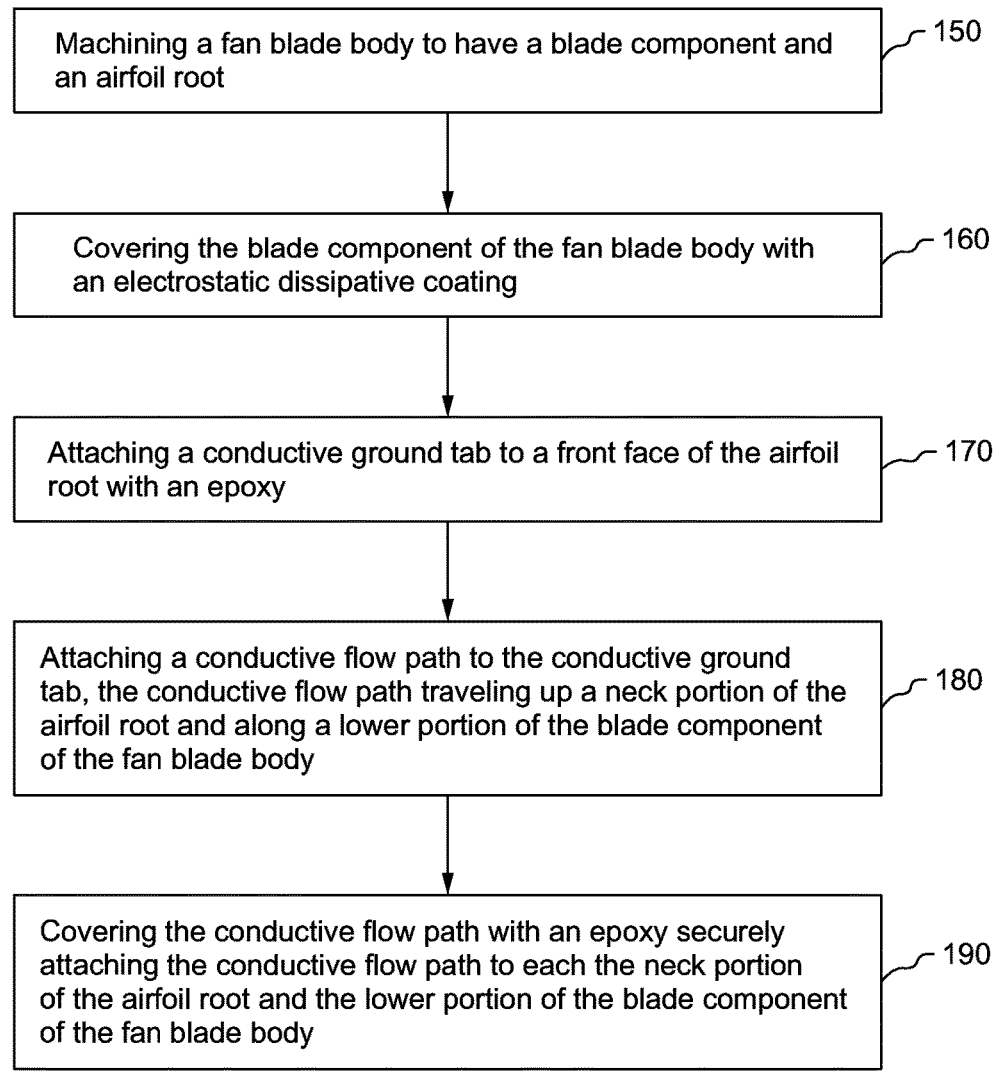
FIG. 7 is a flowchart that exemplifies one method of making the disclosed fan blade in accordance with the present disclosure.

Referring now to FIG. 7, an exemplary succession of steps are shown which may be used to produce an airfoil or fan blade 60 for a gas turbine engine 10 in accordance with the present disclosure. Starting with block 150, a fan blade body 65 is machined to have a blade component 62 and an airfoil root 70. In other embodiments of the present disclosure the fan blade body 65 may have a fin platform 80. The fan blade body 65 is then covered with a static dissipative coating 63 as seen in block 160. In block 170, a conductive ground tab 73 is affixed to the front face 77 of the airfoil root 70 of the fan blade body 65. The conductive ground tab 73 in an embodiment of the present disclosure is bonded to the fan blade body 65 by an epoxy. In block 180, a conductive flow path 100 attaches to the conductive ground tab 73 and travels up the neck portion 71 of the airfoil root 70 and onto a lower portion of the blade component 62 of the fan blade body 65. In another embodiment of the present disclosure which has a fin platform 80 of the fan blade body 65, the conductive flow path 100 travels along the underside 84 of the fin platform 80. In an embodiment of the present disclosure, the conductive flow path 100 consists of two conductive ground wires 100 welded 105 to the top portion of the conductive ground tab 73 although other conductive flow paths 100 as stated above may be used. The two conductive ground wires 100 then travel up the neck 71 of the airfoil root 70 and along the underside 84 of the fin platform 80 of the fan blade body 65. Finally in block 190, an epoxy is added which complete envelopes the conductive flow path 100 as it travel out of the conductive ground tab 73 along the neck 71 of the airfoil root 70 and onto a lower portion of the blade component 62 of the fan blade body 65. As stated earlier, in an embodiment of the present disclosure the conductive flow path 100 consists of two conductive ground wires 100. Manufacturing a fan blade 60 in this fashion allows the buildup of electrostatic charge on the fan blade 60 to migrate to the two conductive ground wires 100 attached to the underside 84 of the fin platform 80 of the fan blade body 65. From there the electrostatic charge flows into the conductive ground tab 73 affixed to the front face 77 of the airfoil root 70 and exits the fan blade 60 through the disc rotor covering 55 which is in contact with the conductive ground tab 73.

It will be appreciated that in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come with the scope of the following claims and equivalents thereof.

INDUSTRIAL APPLICABILITY

From the foregoing, it may be appreciated that the fan blade disclosed herein may have industrial applicability in a variety of setting such as, but not limited to, use in a gas turbine engine environment. Such disclosed fan blade may also be used, for example, in other aerospace machines for generating thrust, helicopters for generating lift, or in industrial or mining applications for generating power.

Additionally in the field of gas turbine engines for aviation, such a fan blade substantially decreases the risks associated with the buildup of electrostatic charge on a fan blade during operation of gas turbine engines. Use of the disclosed fan blade minimizes the potential of radio interference associated with the buildup of electrostatic charge on a fan blade, and substantially reduces the risk of improper ignition of fuel vapors within the gas turbine engine environment. Furthermore, use of the disclosed fan blades reduces material surface damage to the disclosed fan blade and other engine components caused from electrostatic sparks. Moreover, use of the disclosed fan blade prevents injury to working personal approaching the gas turbine engine after operation since the buildup of electrostatic charge has been properly dissipated.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A fan blade capable of dissipating a buildup of electrostatic charge, the fan blade comprising:
    a fan blade body having a blade component, a fin platform, and an airfoil root having a first pressure face with a first runout traveling a length of the first pressure face and second pressure face with a second runout traveling a length of the second pressure face, the blade component of the fan blade body being covered in an electrostatic dissipative coating, wherein the fin platform protrudes outward on each side of the fan blade, and wherein a top side of the fin platform is covered in the static dissipative coating and an underside of the fin platform is not covered in the electrostatic dissipative coating;
    a conductive ground tab attached to a front face of the airfoil root;
    a conductive flow path attached to a top portion of the conductive ground tab and running along the airfoil root and the underside of the fin platform; and
    a wear covering enveloping a length of the first runout fillet of the first pressure face and a length of the second runout fillet of the second pressure face.

2. The fan blade according to claim 1, wherein the electrostatic dissipative coating is a urethane based coating.

3. The fan blade according to claim 1, wherein the conductive flow path is a conductive tape.

4. The fan blade according to claim 1, wherein the conductive flow path is a conductive sheet metal or a conductive foil.

5. The fan blade according to claim 1, wherein the conductive flow path is a conductive coating.

6. The fan blade according to claim 1, wherein the conductive flow path is a plurality of conductive ground wires.

7. The fan blade according to claim 6, wherein the plurality of conductive ground wires are secured to the top portion of the conductive ground tab by a weld, and the plurality of conductive ground wires run from the conductive ground tab up a neck portion of the airfoil root and along the underside of a fin platform of the fan blade body.

8. The fan blade according to claim 7, wherein the plurality of conductive ground wires are completely covered with an epoxy securing the plurality of conductive ground wires to the neck portion of the airfoil root and along the underside of the fin platform of the fan blade body.

9. The fan blade according to claim 1, wherein the conductive ground tab is attached in the middle of a front face of the airfoil root and secured to the front face of the airfoil root by an epoxy.

10. The fan blade according to claim 9, wherein the conductive ground tab is in contact with a disc rotor covering, the conductive ground tab being an end flow point of an accumulated electrostatic charge on the fan blade body and the accumulated electrostatic charge being transferred to the disc rotor covering through contact with the conductive ground tab.

11. A gas turbine engine, comprising:
    a fan having a plurality of fan blades connected to a rotor, the plurality of fan blades each having a fan blade body with a blade component, a fin platform, and an airfoil root having a first pressure face with a first runout traveling a length of the first pressure face and second pressure face with a second runout traveling a length of the second pressure face, the blade component of each of the plurality of fan blades being covered in an electrostatic dissipative coating, a conductive ground tab attached to a front face the airfoil root of each of the plurality of fan blades, a conductive flow path attached to a top portion of the conductive ground tab and running along the airfoil root and an underside of the fin platform; and
    a wear covering enveloping a length of the first runout fillet of the first pressure face and a length of the second runout fillet of the second pressure face,
    wherein the tin platform protrudes outward on each side of the fan blade, and wherein a top side of the fin platform is covered in the static dissipative coating and the underside of the fin platform is not covered in the electrostatic dissipative coating;
    a compressor downstream of the fan;
    a combustor downstream of the compressor; and
    a turbine downstream of the combustor.

12. The gas turbine engine according to claim 11, wherein the conductive flow path of each of the plurality of fan blades is a conductive tape.

13. The gas turbine engine according to claim 11, wherein the conductive flow path of each of the plurality of fan blades is a conductive sheet metal or a conductive foil.

14. The gas turbine engine according to claim 11, wherein the conductive flow path of each of the plurality of fan blades is a conductive coating.

15. The gas turbine engine according to claim 11, wherein the conductive flow path of each of the plurality of fan blades is a plurality of conductive ground wires.

16. The gas turbine engine according to claim 15, wherein the plurality of conductive ground wires of each of the plurality of fan blades are secured to the top portion of the conductive ground tab by a weld, and the plurality of conductive ground wires run from the conductive ground tab up a neck portion of the airfoil root and along an underside of a fin platform of the fan blade body for each of the plurality of fan blades.

17. The gas turbine engine according to claim 16, wherein the plurality of conductive ground wires of each of the plurality of fan blades are completely covered with an epoxy securing the plurality of conductive ground wires to the neck portion of the airfoil root and along the underside of the fin platform of the fan blade body on each of the plurality of fan blades.

18. The gas turbine engine according to claim 11, wherein the conductive ground tab of each of the plurality of fan blades is attached in the middle of a front face of the airfoil root and secured to the front face of the airfoil root by an epoxy.

19. The gas turbine engine according to claim 18, wherein the conductive ground tab of each of the plurality of fan blades is in contact with a disc rotor covering, the conductive ground tab being an end flow point of an accumulated electrostatic charge on the fan blade body and the accumulated electrostatic charge being transferred to the disc rotor covering through contact with the conductive ground tab on each of the plurality of fan blades.

20. A method of making a fan blade capable of dissipating a buildup of electrostatic charge for a gas turbine engine, the method comprising:

machining a fan blade body to have a blade component, a fin platform, and an airfoil root having a first pressure face with a first runout traveling a length of the first pressure face and second pressure face with a second runout traveling a length of the second pressure face, wherein the fin platform protrudes outward on each side of the fan blade;

covering the blade component of the fan blade body with an electrostatic dissipative coating, wherein a top side of the fin platform is covered in the static dissipative coating and an underside of the fin platform is not covered in the electrostatic dissipative coating;

attaching a conductive ground tab to a front face of the airfoil root with an epoxy;

attaching a conductive flow path to the conductive ground tab the conductive flow path traveling up a neck portion of the airfoil root and along the underside of the fin platform; and covering the conductive flow path with an epoxy securely attaching the conductive flow path to each the neck portion of the airfoil root and the lower portion of the blade component of the fan blade body enveloping a length of the first runout fillet of the first pressure face and a length of the second runout fillet of the second pressure face in a wear covering.

* * * * *